United States Patent [19]

Kanayama et al.

[11] Patent Number: 4,484,097
[45] Date of Patent: Nov. 20, 1984

[54] FLAT COIL FOR AN ELECTRIC MACHINE

[75] Inventors: Kenji Kanayama, Kariya; Hidekuni Sugi, Nagoya; Saburo Ito, Kariya; Masatoshi Suzuki, Nishio, all of Japan

[73] Assignee: Nippondenso Co., Ltd., Kariya, Japan

[21] Appl. No.: 501,760

[22] Filed: Jun. 6, 1983

[30] Foreign Application Priority Data

| Jun. 8, 1982 | [JP] | Japan | 57-99028 |
| Jul. 13, 1982 | [JP] | Japan | 57-122525 |
| Jul. 13, 1982 | [JP] | Japan | 57-122526 |

[51] Int. Cl.$^3$ .............................................. H02K 1/22
[52] U.S. Cl. ................................... 310/268; 310/201; 310/208
[58] Field of Search ............... 310/268, 201, 208, 180, 310/184, 156, 114, 64, 45, 43, DIG. 6; 29/598

[56] References Cited

U.S. PATENT DOCUMENTS

| 3,189,770 | 6/1965 | Henry-Baudot | 310/268 |
| 3,189,773 | 6/1965 | Henry-Baudot | 310/268 |
| 3,231,771 | 1/1966 | Henry-Baudot | 310/268 |
| 3,231,774 | 1/1966 | Henry-Baudot | 310/268 |
| 3,480,815 | 11/1980 | Knapp | 310/268 |
| 3,500,095 | 3/1970 | Keogh | 310/268 |
| 3,549,928 | 12/1970 | Knapp | 310/268 |
| 3,906,267 | 9/1975 | Coupin | 310/156 |
| 3,953,751 | 4/1976 | Merkle | 310/268 |
| 3,999,092 | 12/1976 | Whiteley | 310/114 |
| 4,190,780 | 2/1980 | Whiteley | 310/64 |
| 4,341,973 | 7/1982 | Maruko | 310/268 |

FOREIGN PATENT DOCUMENTS

| 990773 | 6/1976 | Canada | 310/268 |
| 1206071 | 12/1965 | Fed. Rep. of Germany | 210/268 |
| 1496835 | 8/1966 | France | 310/268 |
| 695990 | 10/1965 | Italy | 210/268 |
| 1491024 | 12/1974 | United Kingdom | 310/268 |

Primary Examiner—R. Skudy
Attorney, Agent, or Firm—Cushman, Darby & Cushman

[57] ABSTRACT

A flat coil for use in a rotary electric machine has an annular row of generally radially extending and circumferentially spaced electrically conductive segments (1) on each annular end face of an electrically insulating base member (2). Each segment has a non-effective section disposed adjacent to the radially inner end of the segment and having a mean thickness greater than that of the remaining sections of the segment to improve the cooling ability of the coil. The segments are formed by punching a blank of thin copper sheet to form therein an annular row of radially extending and circumferentially spaced slits to thereby form an annular row of radially extending and circumferentially spaced segments. Before or after the blank is punched, the blank is subjected to forging, electrolytic plating, electrolyzing treatment or mechanical treatment so that the non-effective section of each segment has a thickness greater than that of the remaining sections. Thereafter, the annular row of segments is secured to an annular end face of the annular base member. A similar another annular row of segments is prepared and secured to the other end face of the annular base member. The segments of the two annular rows are then welded at their radially inner and outer ends to form three separate windings of coil around the base member. The annular rows of the segments are then severed along the outer and inner peripheral edges of the rows to separate the segments from the blanks to thereby complete the flat coil.

7 Claims, 34 Drawing Figures

FIG. 20 FIG. 21 FIG. 22A FIG. 22B
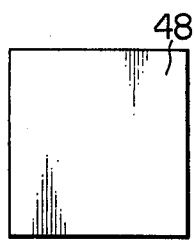 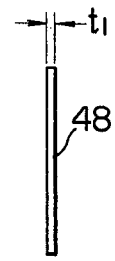 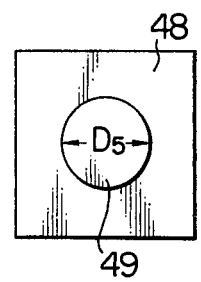 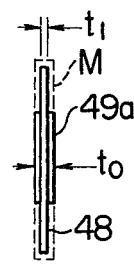
FIG. 23 FIG. 24A FIG. 24B
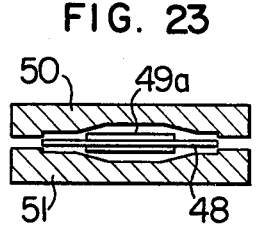 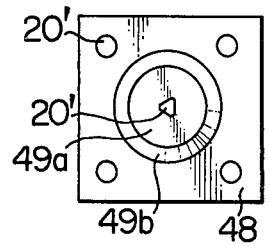 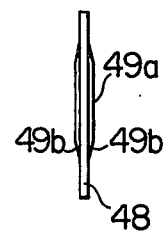
FIG. 25 FIG. 26
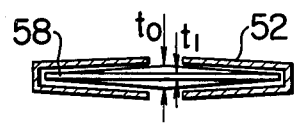 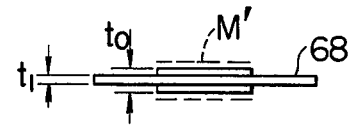

FLAT COIL FOR AN ELECTRIC MACHINE

FIELD OF THE INVENTION

The present invention relates to an improved structure of a flat coil for use in an armature of a rotary electric machine and to a method of manufacturing the flat coil. Flat coils manufactured by the present invention are useful in print motors, flat motors, flat type alternators with three-phase armature windings or the like.

DESCRIPTION OF THE PRIOR ART

The flat coil of the class specified includes a large number of electrically conductive segments disposed on the opposite sides of an annular insulating plate or disc such that the segments extend generally radially and are spaced circumferentially of the insulating disc. The segments on the opposite sides of the disc are electrically connected at their inner and outer ends to form windings. Because of this arrangement, the spaces between the respective segments on each side of the insulating disc are narrowed towards the center of the disc, with a result that the width or the circumferential dimension of each segment and thus the effective cross section thereof are gradually reduced radially inwardly. Thus, a large amount of heat is produced in the radially inner part of the coil with a resultant increase in the power loss.

In addition, because of the structure inherent to rotary electric machine, the radially inner part of the flat coil is disposed adjacent to another heat source, such as bearings, and thus tends to give rise to trouble in the cooling point of view. The production of a large amount of heat in this part of the coil greatly affects the efficiency and durability of an associated rotary electric machine.

Moreover, print motors and flat motors are now designed to be of reduced sizes and yet to produce increased outputs. This tends to increase the temperature of the flat coil in its entirety. Thus, there is a strong demand for the avoidance of concentration of heat to the localized part of the flat coil.

SUMMARY OF THE INVENTION

It is an object of the present invention to provide an improved flat coil structure which is effective to widely distribute or disperse the heat produced therein and thus to contribute to the reduction in the sizes of rotary electric machines.

According to one feature of the present invention, there is provided a flat coil for use in a rotary electric machine having a rotary shaft, said coil comprising a relatively thin annular base of an electrically insulating material having opposite annular end faces and outer and inner peripheral edges, said inner peripheral edge defining a central opening for said shaft, and first and second annular rows of generally radially extending and circumferentially spaced axially thin segments of an electrically conductive material, said first and second annular rows of segments being secured to said annular end faces of said base, the segments of said first and second annular rows having radially outer and inner ends electrically connected adjacent to said outer and inner peripheral edges to form at least one winding extending substantially spirally around said annular base, each of said segments including a non-effective section adjacent to said radially inner end of said segment and an effective section adjacent to and radially outward of said non-effective section, wherein said non-effective section of each segment has a first mean thickness measured in the axial direction of said coil, said effective section has a second mean thickness measured in the axial direction of said coil, and said first mean thickness is greater than said second mean thickness.

It is another object of the present invention to provide a method of manufacturing the improved flat coil of the structure specified above.

According to another feature of the invention, there is provided a method of manufacturing a flat coil for use in a rotary electric machine, said coil including an annular row of generally radially extending and circumferentially spaced electrically conductive segments on each annular end face of an electrically insulating annular base member, said method including the steps of:

preparing a relatively axially thin annular base member of an electrically insulating material;

preparing two blanks of an electrically conductive thin sheet metal;

forming an annular row of generally radially extending and circumferentially spaced slits in each of said blanks so that the blank is formed therein with an annular row of generally radially extending and circumferentially spaced segments between respective slits, said annular row of segments having outer and inner diameters substantially equal to those of said annular base member, respectively;

forging each blank so that the thickness of the annular row of segments is decreased toward the outer peripheral edge of said annular row of segments; and securing the thus forged annular rows of segments of said blanks to the oppisite end faces of said annular base member to form at least one winding around said annular base member.

According to a further feature of the invention, there is provided a method of manufacturing a flat coil for use in a rotary electric machine, said coil including an annular row of generally radially extending and circumferentially spaced electrically conductive segments on each annular end face of an electrically insulating annular base member, said method including the steps of:

preparing two blanks of an electrically conductive thin sheet metal each having a substantially uniform thickness;

subjecting each of said blanks to one of electrolytic plating and electrolyzing treatments to cause a difference in thickness between a substantially circular central zone of the blank and the remaining zone of said blank so that the thickness is greater in said central zone than in said remaining zone, forming an annular row of generally radially extending and circumferentially spaced slits substantially coaxially with said circular central zone in each of said blanks so that the blank is formed therein with an annular row of generally radially extending and circumferentially spaced segments between respective slits, each segment having its radially inner section disposed within said circular central zone;

preparing an annular base member of an electrically insulating material having outer and inner diameters substantially eual to those of the annular row of segments of each blank; and securing the annular rows of segments of said blanks to the opposite end faces of said annular base member to form at least one winding around said base member.

According to a still further feature of the invention, there is provided a method of manufacturing a flat coil for use in a rotary electric machine, said coil including an annular row of generally radially extending and circumferentially spaced electrically conductive segments on each annular end face of an electrically insulating annular base member, each of said segments including a non-effective section adjacent to the radially inner end of the segment, said method includihg the steps of:

preparing two blanks of an electrically conductive thin sheet metal;

deciding an annular zone within each blank, said annular zone having outer and inner diameters substantially equal to those of circles on which the radially outer and inner ends of said non-effective section of each of said segments are respectively disposed in said flat coil;

deciding an annular row of generally radially extending and circumferentially spaced small areas in said annular zone;

cutting said blank along one of the generally radial sides of each of said small areas and also along the two generally circumferentially extending sides of said small area to form a tab intergral with said blank along the other generally radial side of said small area;

bending each tab about said other radial side of said small area and folding the thus bent tab over the remaining area of said annular zone;

forming an annular row of generally radially extending and circumferentially spaced slits in each of said blanks so that the blank is formed therein with an annular row of generally radially extending and circumferentially spaced segments between respective slits and so that each segment includes therein one of the thus folded tabs; and preparing a relatively axially thin annular base member of an electrically insulating material having outer and inner diameters substantially equal to those of the annular row of the thus formed segments of each blank;

securing the thus formed annular rows of segments of said blanks to the opposite end faces of said annular base member to form at least one winding around said annular base member.

The above and other objects, features and advantages of the present invention will be made apparent by the following description with reference to the accompanying drawings.

BRIEF DESCRIPTION OF THE DRAWINGS

FIGS. 20 through 26 illustrate the steps of another embodiment of the method of manufacturing the flat coil shown in FIGS. 1 to 4.

DESCRIPTION OF PREFERRED EMBODIMENTS

Figure 1:
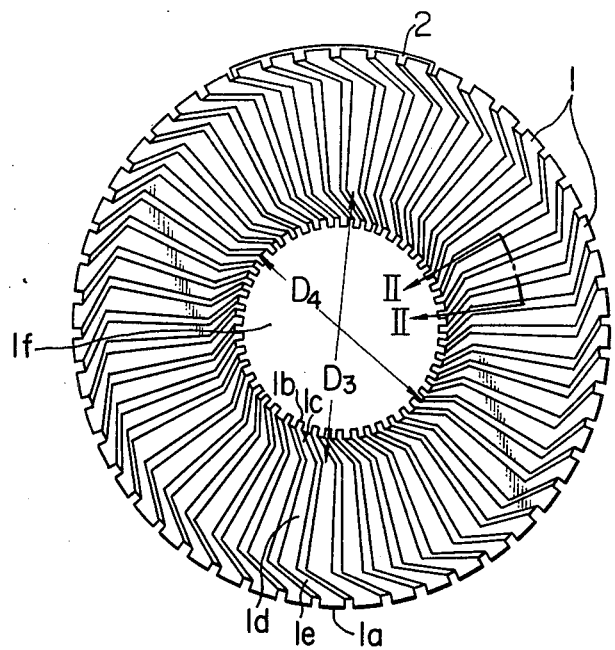
FIG. 1 is a plan view of an embodiment of a flat coil according to the present invention.
Figure 2:
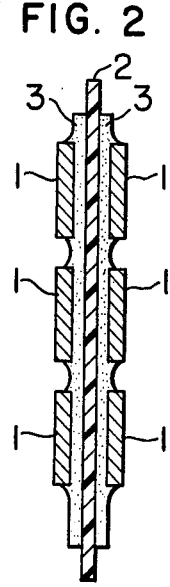
FIG. 2 is an enlarged fragmentary sectional view of the flat coil taken along line II—II in FIG. 1.
Figure 3:
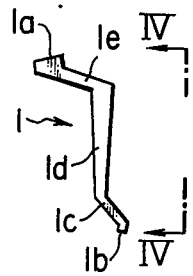
FIG. 3 is a plan view of one of the segments shown in FIGS. 1 and 2.

Referring first to FIGS. 1 to 4, a flat coil includes a relatively thin annular base plate or disc 2 formed of an insulating material such as mica plate, insulating plastic plate or insulating cloth. To each side (i.e., end face) of the disc 2, a large number of generally radially elongated, electrically conductive segments 1 of copper are secured by means of ceramic adhesive 3 such that the segments 1 extend generally radially and are circumferentially spaced to form a circumferential row of segments on each side of the disc 2, as shown in FIG. 1. The radially outer and inner ends 1a and 1b of each segment 1 extend slightly radially outwardly and inwardly from the outer and inner peripheral edges of the disc 2, respectively. Each segment 1 is generally zig zag when viewed axially of the coil, as best seen in FIG. 3. The segments 1 on the opposite sides of the disc 2 are welded together at their radially outer and inner ends 1a and 1b such that the segments on the opposite sides of the disc 2 form three separate (three-phase) windings of the coil. The radially inner welded ends 1b of the segments 1 cooperate together to define a substantially circular opening 1f for a shaft of a rotary electric machine.

Each segment 1 has a first non-effective section 1c adjacent to the radially inner end 1b, a second non-effective section 1e adjacent to the radially outer end 1a and an intermediate effective section 1d between the first and second non-effective sections 1c and 1e. The term "effective section" used herein means a section which is effective to produce torque or electromotive force due to the interlinkage of field magnetic fluxes. It will be seen in FIG. 1 that the effective sections 1d of respective segments 1 are disposed between the radially inner and outer peripheral edges of the flat coil.

Figure 4:
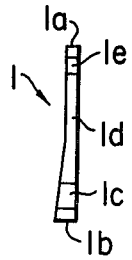
FIG. 4 is a side elevation of the segment as viewed from line IV—IV in FIG. 3.

It will be seen in FIGS. 3 and 4 that the thickness of each segment 1 as measured in the axial direction of the coil is gradually increased from substantially the center of the effective section 1d, over section 1c, to the radially inner end 1b, whereas the dimension of the width of the segment 1 as measured in the circumferential direction of the coil is gradually decreased from the outer end of the effective section 1d to the radially inner end 1b. Because of this structure of each segment 1, the thickness of the coil is greater in its radially inner zone than in the radially outer zone to suppress the increase in the current density in the radially inner zone.

Figure 5:
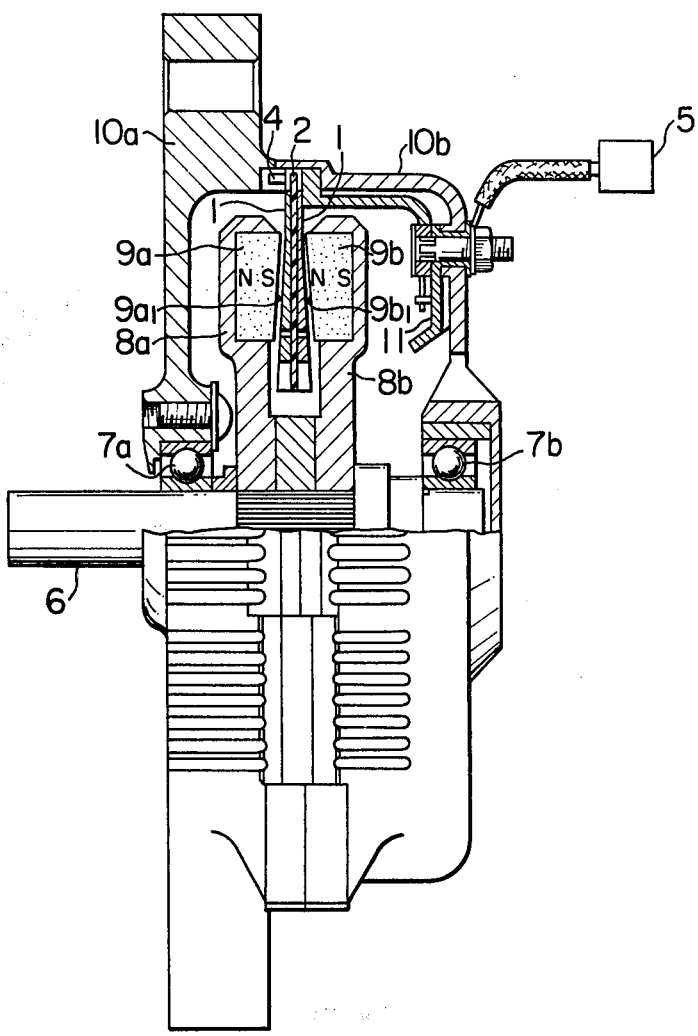
FIG. 5 is a party sectional side view of a generator in which a flat coil according to the present invention is used.

FIG. 5 is a partially sectional view of an alternator in which the flat coil of the described embodiment is used. Reference numerals 4 and 5 respectively designate an electric terminal and an electric connector. A shaft 6 is rotatably supported by bearings 7a and 7b mounted on housings 10a and 10b, respectively. A pair of rotors 8a and 8b are secured to the shaft 6 and disposed on the opposite sides of the flat coil which includes an annular insulating plate or disc 2 and segments 1 secured to the opposite sides of the disc 2, as described previously. The flat coil is secured at its outer peripheral edge to the housing 10b to form an armature of the alternator. The rotors 8a and 8b cary thereon parmanent magnets 9a and 9b having faces 9al and 9bl which are directed to those zones of the flat coil which are formed by the effective sections 1d of respective segments 1 on the opposite sides of the annular insulating disc 2. The magnet faces 9al and 9bl are respectively inclined to accomodate the axial sectional configuration of the flat coil so that the air gaps in the magnetic circuit is minimized. The alternator is provided with a conventional thyristor bridge 11 for rectifying an alternating current into a direct current.

When the shaft 6 is rotated with the magnets 9a and 9b, the segments 1 of the coil are interlinked with the field magnetic fluxes from the magnets 9a and 9b to produce a three-phase alternating current in the flat coil. The alternating current thus produced is rectified by the thyristor bridge 11 into a direct current of a predetermined voltage.

Such a generator in general has a tendency that, when the generator is designed to produce an increasd output, a flat coil used in the generator is subjected to temperature rise. In the flat coil of the described embodiment of the present invention, however, the thickness of the coil in the axial direction thereof is greater in its radially inner zone, where the heat tends to be concentrated most, than in the radially outer zone of the coil. Thus, the heat can be distributed or dispersed widely throughout the coil to improve the cooling ability of the flat coil. Accordingly, the flat coil can provide an increased output and an improved efficiency without substantial increase in the weight and size of the flat coil.

The flat coil of the present invention may also be used in a print motor which is electrically energized by direct current. In this instance, the first or radially inner non-effective sections 1c of the segments 1 of the flat coil are contacted by carbon brushes. Because the production of heat in the radially inner zone of the flat coil according to the present invention is decreased compared with the prior art, the durability of the carbon brushes is advantageously increased.

In general, moreover, a large amount of heat tends to be accumulated in the radially inner zone of a flat coil used in a rotary electric machine. In addition, such a rotary machine includes members to be cooled, such as bearings, disposed in a central zone of the machine. From these points of view, the flat coil according to the present invention is advantageous in that the production of heat in the radially inner zone of the flat coil is reduced compared with the prior art.

Figure 6:
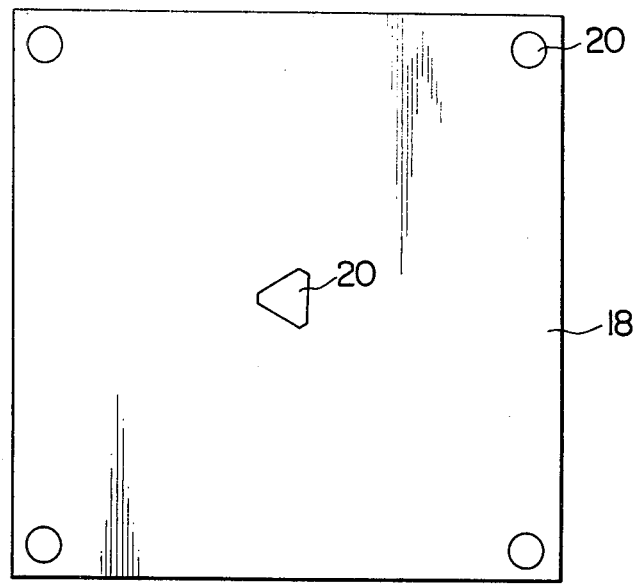
FIGS. 6 through 10B illustrate the steps of an embodiment of a method of manufacturing the flat coil shown in FIGS. 1 to 4.
Figure 7:
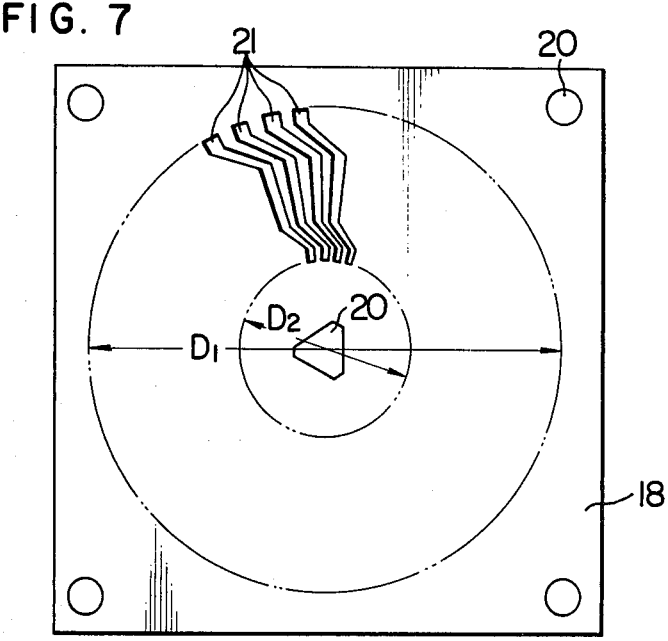
Figure 8A:
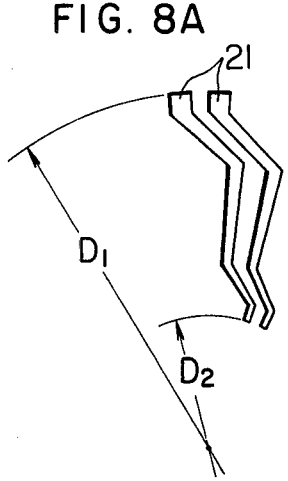
Figure 8B:
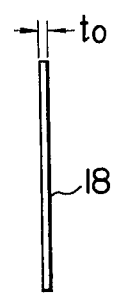
Figure 9:
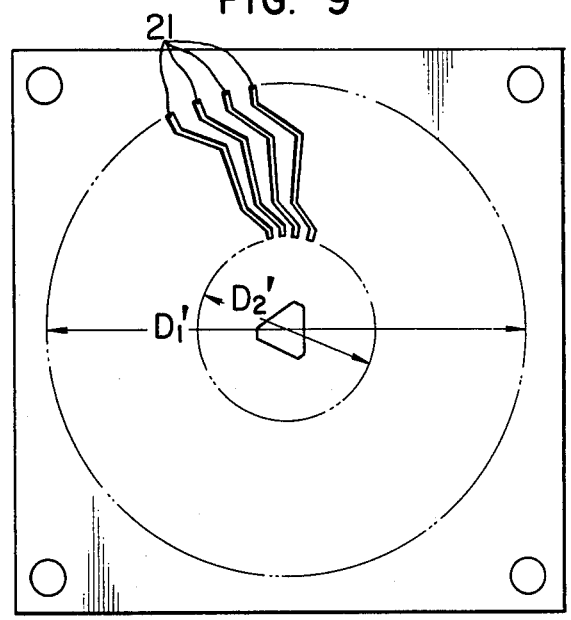

Now, an embodiment of a method of producing the flat coil shown in FIGS. 1 to 4 will be described with reference to FIGS. 6 through 10B. A blank 18 of copper sheet having a thickness $t_o$ is first prepared. The blank 18 is then formed therein with reference openings 20 for a notching press (not shown), as shown in FIG. 6. Then, the blank 18 is subjected to a punching operation in which the notching press referred to above is used for punching out an annular row of circumferentially spaced slits 21, as shown in FIG. 7. The outer and inner diameters of the annular row of the slits 21 are D1 and D2, respectively. Preferably, the slitted blank 18 may then be annealed at about 500° C. for 1 hour. Thereafter, the annealed blank 18 is subjected to forging by which the annular slitted section having the outer and inner diameter of D1 and D2 and the thickness of $t_o$, as shown in FIGS. 7 and 8A and 8B, is forged so that the slitted annular section now has outer and inner diameters D1' and D2', as shown in FIG. 9, and the thickness of the slitted annular section is radially outwardly decreased to t1 which is smaller than $t_o$, as shown in FIG. 10B. Thereafter, the peripheral edges of respective slits 21 are trimmed by a second punching operation. The trimmed slits 21 define therebetween segments one of which is shown as at 1' in FIG. 10A, the segment 1' corresponding to the segment 1 shown in FIGS. 3 and 4.

Another blank of copper sheet is also prepared and processed in the manner described above to form a second annular row of segments 1'.

An annular insulating plate or disc 2 is prepared and coated with layers 3 of ceramic adhesive. The disc 2 has outer and inner diameters substantially equal to D1 and D2, respectively.

The two blanks 18, in each of which the annular row of punched and trimmed slits 21 are formed to define the segments 1' between the respective slits 21, are then assembled with the adhesive-coated disc 2 so that the annular rows of the segments 1' are adhesively secured to the opposite sides of the disc 2. Then, the radially inner and outer ends of the segments 1' on one side of the disc 2 are welded to the radially inner and outer ends of the segments 1' on the other side of the disc 2 such that the welded segments 1' form three separate windings. Then, the blanks 18 are cut or severed along the circles having the diameters D1' and D2' to remove the outer peripheral zones and the circular central zones of the blanks from the segments 1' now adhesively secured to the disc 2 to thereby complete a flat coil.

It will be appreciated by those in the art that the pieces of the blank 18 which have been punched out to form the slits 21 can also be used as segments to be secured to an insulating disc of a flat coil. In such a case, the slits 21 may preferably be punched together with one of the outer peripheral zone and the circular central zone of the blank 18 (i.e., the "outer zone", for example) to assure that the segments 1' are still integral with the other of the outer peripheral zone and the circular central zone of the blank 18 (i.e., the "central zone") while the segments separated from the segments 1' are integral with the outer zone of the blank.

Figure 11:
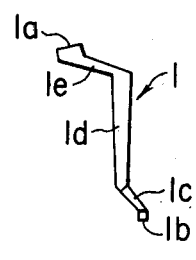
FIGS. 11 and 12 are views similar to FIGS. 3 and 4 but show a modified structure of each segment of the flat coil shown in FIGS. 1 and 2.
Figure 12:
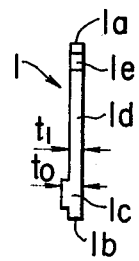

Referring now to FIGS. 11 and 12, a modified segment 1 has a uniform axial thickness $t_l$ except for the first non-effective section 1c which has an increased axial thickness $t_0$ which is uniform throughout its radial length rather than being gradually increased as shown in FIG. 4.

Figure 13:
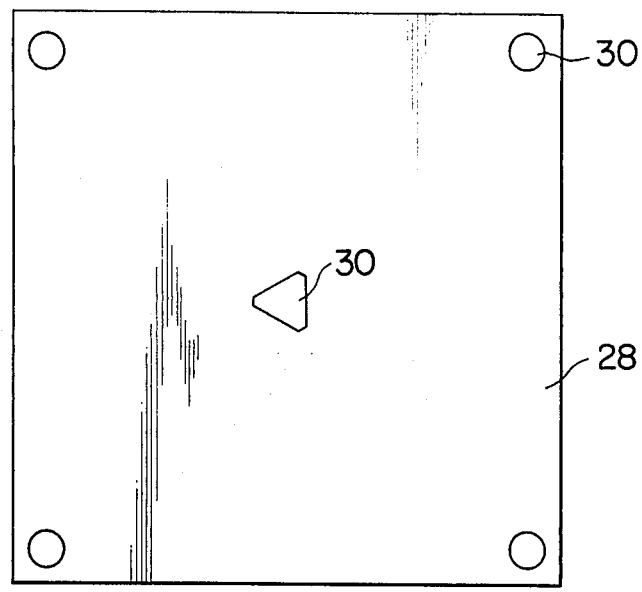
FIGS. 13 through 19 illustrate the steps of a method of manufacturing the flat coil having segments of the structure shown in FIGS. 11 and 12.
Figure 14:
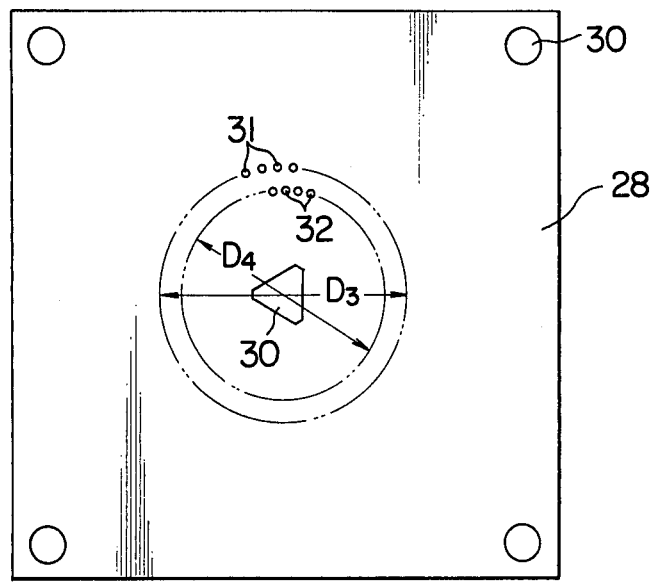
Figure 15:
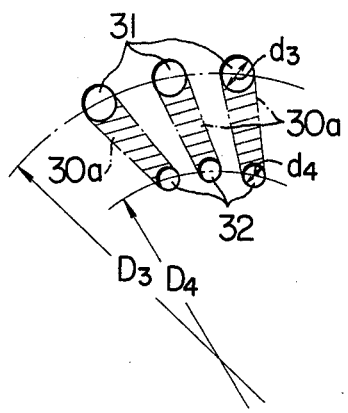

A method of making the modified segments 1 shown in FIGS. 11 and 12 will be described with reference to FIGS. 13 through 19. A blank 28 of copper sheet having a thickness of $t_l$ is prepared first and formed therein with reference openings 30 for a notching press (not shown), as shown in FIG. 13. Then, apertures 31 and 32 are formed in the blank 28 on two circles having diameters D3 and D4 substantially equal to the diameters of circles on which the radially outer and inner ends of the first non-effective sections 1c of an annular row of segments 1 of a finished flat coil are disposed, as shown in FIG. 1. The apertures 31 and 32 are of diameters d3 and d4, respectively.

Figure 17:
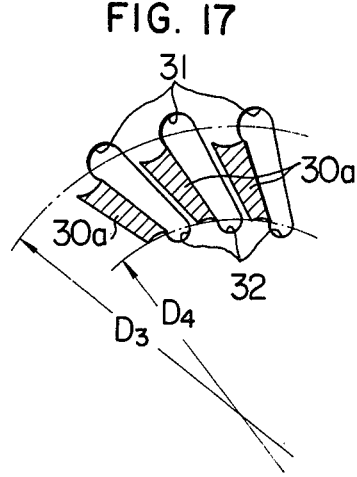
Figure 18A:
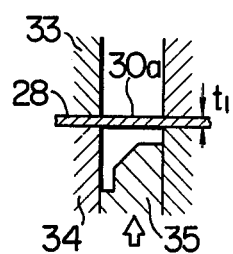
Figure 18B:
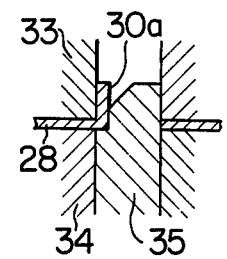
Figure 18C:
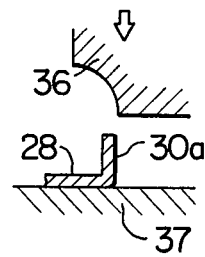
Figure 18D:
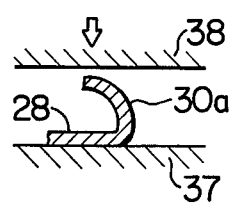
Figure 18E:
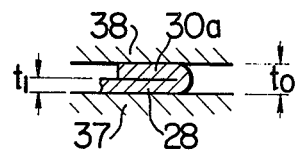
Figure 16:
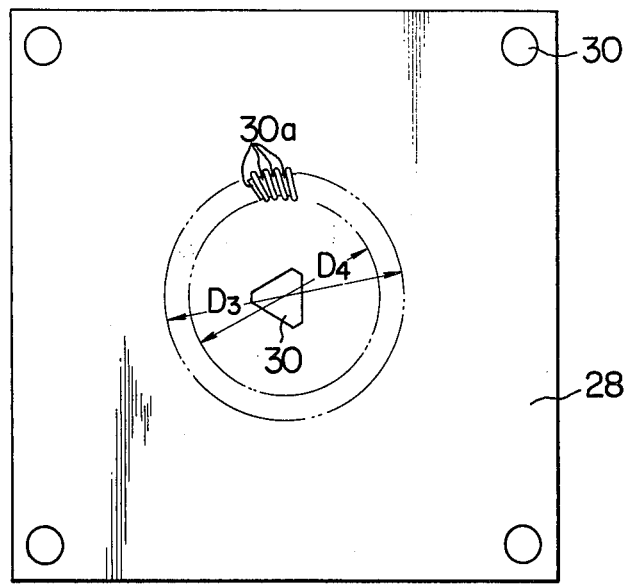
Figure 19:
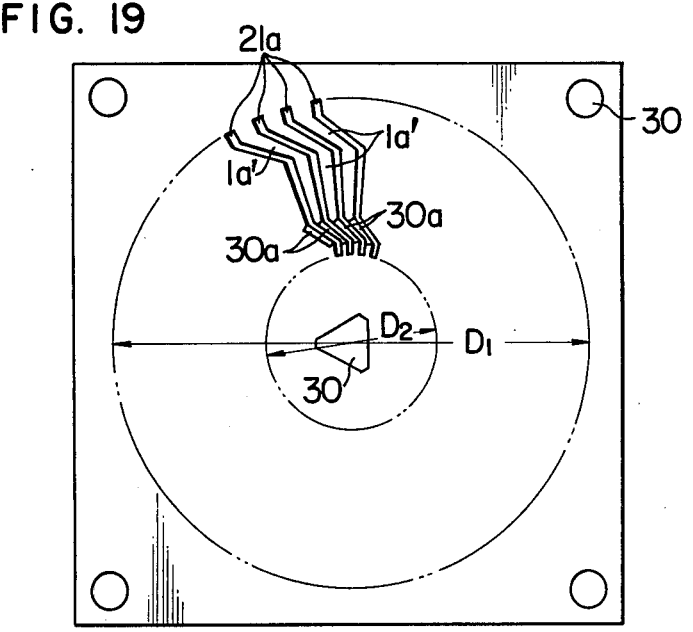

Then, a section 30a (indicated by hatching) extending between a radially outer aperture 31 and an adjacent radially inner aperture 32 is cut along one side and bent and folded about the other side over the blank 28, as shown in FIGS. 16 and 17. The cutting and folding may preferably be carried out as follows: First, the blank 28 is placed between a punch 33 and a cushion 34 such that each of the hatched sections 30a of the blank 28 is disposed in the path of movement of an associated punch 35, as shown in FIG. 18A. Then, the punch 35 is driven to cut one side of the hatched section 30a and simultaneously bend the section 30a upright to form a tab, as shown in FIG. 18B. Then, the blank 28 is moved to a point under a second punch 36 shown in FIG. 18C. The punch 36 cooperates with a flat anvil 37 to further bend the upright tab 30a from its upright position to a further bent position shown in FIG. 18D. Then, the blank 28 is again moved to a position under a flat punch 38 which cooperates with the flat anvil 37 to further bend or fold the tab 30a onto the surface of an adjacent part of the blank 28. The thus folded tab 30a forms the material which increases the axial thickness $t_l$ of the first non-effective section 1c of each sector 1 to a thickness $t_0$.

It will be apparent to those in the art that the apertures 31 and 32 may alternatively be in the form of slits having lengths equal to the diameters d3 and d4 of the apertures 31 and 32, respectively.

Figure 10A:
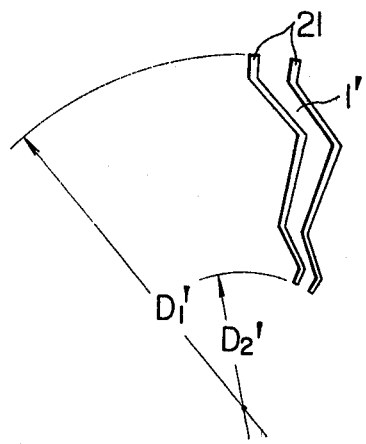
Figure 10B:
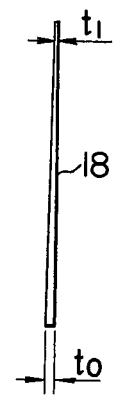

The blank 28 is then punched to form an annular row of circumferentially spaced slits 21a similar or identical to the slits 21 shown in FIGS. 7 and 8A, whereby the blank 28 is now shaped to have an annular row of segments 1a' corresponding to the segments 1' shown in FIG. 10A. The rest of the method of making the modified segments 1 shown in FIGS. 11 and 12 is the same as or similar to that part of the method of making the segments of FIGS. 3 and 4 which begins with the forging step (in the case where the blank is not annealed). Thus, any further part of the method of making the modified segments shown in FIGS. 11 and 12 will not be described herein.

Referring now to FIGS. 20 through 26, another embodiment of the method of manufacturing the flat coil of the structure shown in FIGS. 1 through 4 will be described. A blank 48 of copper sheet having a thickness $t_l$ is prepared, as shown in FIGS. 20 and 21. Then, the opposite sides of the blank 48 excepting central circular areas 49 having diameter D5 (see FIG. 22A) are coated with a masking material M (FIG. 22B). An example of the masking material is "FRON MASK MA - 1" (trade name) manufactured by FURUTO SANGYO KABUSHIKI KAISHA, Japan. The masked blank 48 is then subjected to an electrolytic plating which is conducted in an electrolytic liquid, at a current density of from 0.1 to 0.3 A/cm$^2$ and for 140 minutes, whereby the blank 48 is now provided with a plated and thickened central circular zone 49a having a thickness $t_0$. Examples of the electrolytic liquid are shown in Table 1 below.

TABLE 1

| Electrolytic liquids | Composition | Quantity (g/liter) |
| --- | --- | --- |
| Solution of copper sulfate | Copper sulfate | 125-250 |
| | Sulfuric acid | 30-100 |
| | Chlorine | 0.02-0.18 |
| Solution cyanogen | Copper cyanide | 60-80 |
| | Free cyanogen | 5-10 |
| | Potassium Hydroxide | 20-35 |
| | Potassium rhodanate | 0-20 |

The blank 48 having the thickened central zone 49a is then placed between a pair of forging dies 50 and 51 (FIG. 23) which are then urged toward each other at 10-20 tons by a crank press (not shown), so that the blank 49 is forged at an annular zone adjacent to the outer periphery of the thickened central zone 49a to provide annular inclined or frust-conical sections 49b between the circular central section and the outer peripheral section. The forged blank 48 is then formed therein with reference openigns 20' similar to the reference openings 20 shown in FIGS. 6, 7 and 9. The surfaces of the forged blank 48 may preferably be polished before the blank is formed with the reference openings 20'.

Then, the blank 48 is punched to form an annular row of circumferentially spaced slits similar to the slits 21 shown in FIGS. 7-9. The blank 48 is further processed as in the first embodiment of the method to form a first annular row of segments 1 to be secured to one side of an annular insulating plate or disc 2. Another blank is also processed in the manner described above to form a second annular row of segments 1 to be secured to the other side of the disc 2. The first and second annular rows of segments 1 on the opposite sides of the disc 2 are welded at their radially inner and outer ends so that a plurality of (for example, 3) separate windings are formed to complete a flat coil.

The electrolytic plating step may alternatively be carried out by using an annular electrically insulating cover 52 which is applied to both sides of a blank 58 of copper sheet of a thickness tl, except for the central circular zones of the sides of the blank, and which is effective to assure that the thickness of each of the plated layers is gradually reduced radially outwardly from the central circular zone in which the original thickness tl of the blank 58 is increased to $t_0$, as shown in FIG. 25. This alternative plating step can eliminate the forging step shown in FIG. 23.

Further, alternatively, a blank 68 of copper sheet having a thickness $t_0$ may be prepared and subjected to an electrolyzing process in which a central circular zone of the blank 68 is covered with a mask M' so that the outer peripheral zone is electrolyzed to a reduced thickness $t_1$, as shown in FIG. 26. In this case, the blank 68 is placed as an anode plate while the blank 48 which is shown in FIGS. 22A and 22B and has its outer peripheral zone covered with the mask M may preferably be placed as a cathode plate whereby the electrolytic plating discussed in connection with FIGS. 22A and 22B and the electrolyzation discussed in connection with FIG. 26 can advantageously be carried out simultaneously.

What is claimed is:

1. A flat coil for use in a rotary electric machine having a rotary shaft, said coil comprising a relatively thin annular base of an electrically insulating material having opposite annular end faces and outer and inner peripheral edges, said inner peripheral edge defining a central opening for said shaft, and first and second annular rows of generally radially extending and circumferentially spaced axially thin segments of an electrically conductive material, said first and second annular rows of segments being secured to said annular end faces of said base, the segments of said first and second annular rows having radially outer and inner ends electrically connected adjacent to said outer and inner peripheral edges of said base to form at least one winding extending substantially spirally around said annular base, each of said segments including a non-effective section adjacent to said radially inner end of said segment and an effective section adjacent to and radially outward of said non-effective section, wherein said non-effective section adjacent to said radially inner and of each segment has a first mean thickness measured in the axial direction of said coil, said effective section has a second mean thickness measured in the axial direction of said coil, and said first mean thickness is greater than said second mean thickness.

2. A flat coil according to claim 1, wherein the thickness of said non-effective section of each segment is gradually increased toward the radially inner end of said segment.

3. A flat coil according to claim 1, wherein the thickness of said non-effective section of each segment is substantially uniform throughout the radial length of said non-effective section.

4. A flat coil according to claim 1, 2 or 3, wherein each of said segments is generally zig zag as viewed in the axial direction of said coil and wherein the segments of said first and second annular rows are arranged to form a plurality of separate windings of said coil.

5. A flat coil according to claim 4, wherein said segments are made of copper and secured to said base by means of ceramic adhesive.

6. A flat coil according to claim 5, wherein each of said segments further includes an additional non-effective section disposed between said effective section and said radially outer end and has a mean thickness not greater than that of said effective section.

7. A flat coil according to claim 2, wherein the axial thickness of each segment is gradually increased continuously from a point within said effective section to said radially inner end.

* * * * *